May 7, 1935.  J. G. DOUGHERTY  2,000,438
ELECTRIC HEATING
Filed Nov. 28, 1931  2 Sheets-Sheet 1
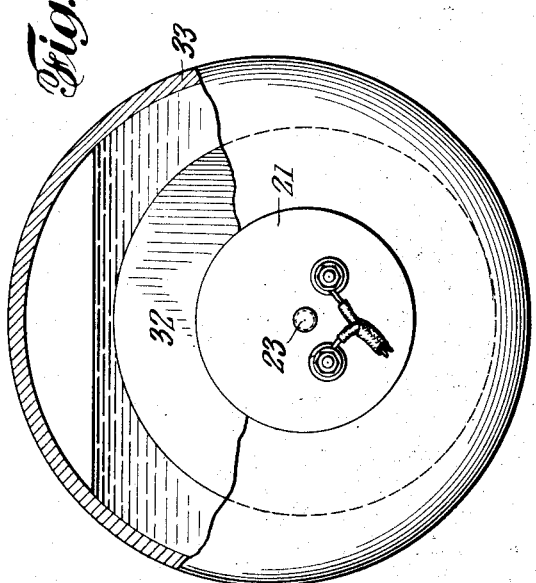
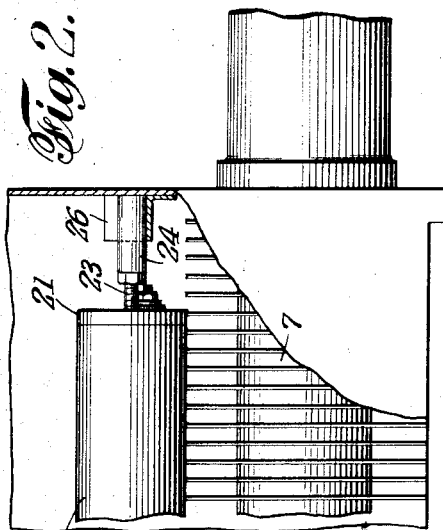
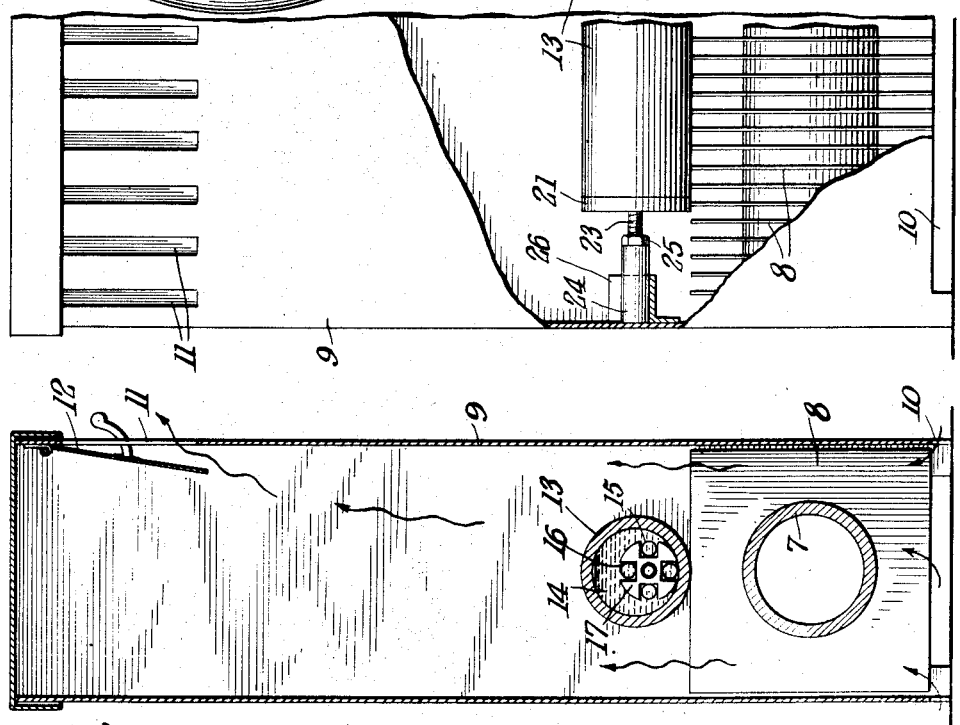
INVENTOR
James G. Dougherty
BY
ATTORNEY May 7, 1935. J. G. DOUGHERTY 2,000,438
ELECTRIC HEATING
Filed Nov. 28, 1931 2 Sheets-Sheet 2
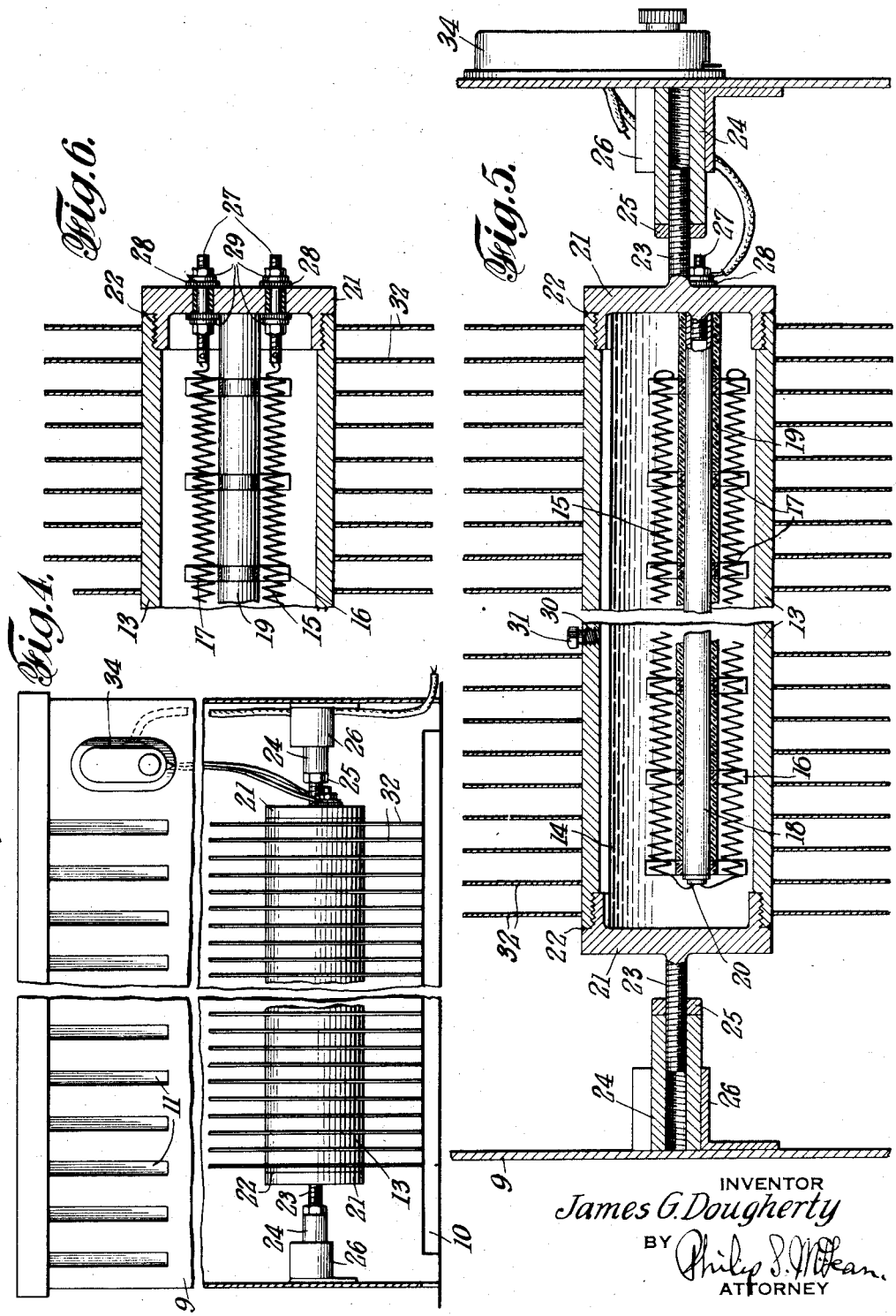
INVENTOR
James G. Dougherty
BY
ATTORNEY Patented May 7, 1935

2,000,438

UNITED STATES PATENT OFFICE 2,000,438

ELECTRIC HEATING

James G. Dougherty, New York, N. Y.

Application November 28, 1931, Serial No. 577,779

5 Claims. (Cl. 219—38)

This invention relates to electric heating generally, and the objects of the invention are to provide an efficient and economical electric unit, of sturdy practical construction, adapted for various uses, such as the heating of water in a boiler, the heating of the air in a room, or the like and, in connection with the latter, a special object of the invention is to combine this new electric heater in a practical way with a "convection" type or "stack" radiator.

The foregoing and other desirable objects are attained by the novel features of construction, combinations and relations of parts hereinafter set forth and broadly claimed.

The drawings accompanying and forming part of the specification illustrate certain desirable embodiments of the invention, but as will be clear from the scope of the claims, the actual physical structure may be modified and changed in various ways all within the true intent of the invention.

Fig. 1 is a vertical sectional view of a so-called stack radiator of generally conventional form but having the new electric heating unit combined therewith and intended for use at such times as the steam or other source of heat supply may be diminished or cut off from the radiator.

Fig. 2 is a broken part sectional and part front elevational view of the radiator equipped with the electric heating unit as an auxiliary or accessory.

Fig. 3 is a broken and partly cross-sectional view showing a special form of the heating unit equipped with fins and employed in a water heating boiler.

Fig. 4 is a broken front elevation and partly sectional view of an entirely electric form of stack radiator in which the electric heating unit carries its own heat radiating fins instead of using the fins or plates in position in the steam radiator as in Figs. 1 and 2.

Fig. 5 is an enlarged broken longitudinal sectional view of the special heating unit shown in Fig. 4.

Fig. 6 is a broken sectional detail of the heating unit as taken on a horizontal plane.

The stack radiator shown in Figs. 1 and 2 is of more or less conventional form embodying a steam or hot water pipe 7, carrying closely spaced plates or fins 8, said pipe with its fins being mounted in the lower portion of a casing or "stack" 9, open at the bottom at 10 for admission of air and having suitable openings 11 in the upper portion for exit of the heated air, under control of a suitable damper 12.

An electric heating unit of special construction is combined with this radiator, so as to utilize the properties of the radiating fins and cause the radiator to operate on the stack principle, as originally designed.

This electric unit comprises a tubular metallic casing 13, directly engaged with and shown as resting on the fins or plates 8, so as to impart heat thereto by conduction, said tube containing oil 14, in which there is immersed a heat generating conductor, coil or coils 15.

As shown particularly in Figs. 5 and 6, the heating coils 15 are supported and properly spaced by being located in the slots 16 of the porcelain or other insulating discs 17, strung on a central tubular support 18 and spaced by porcelain, or the like insulating sleeves 19. The central tubular support may be a thermostat for automatically controlling the circuit through the heating coils and is so indicated in Fig. 5, where the heating coils are shown at 20 as connected in with such thermostat for control purposes.

While the structure of this unit may vary, it has been found practical to make the casing 13 of a length of tubing having caps or closures 21 screwed in the opposite ends of the same and sealed tight as by brazing, welding or soldering at 22. Such construction is particularly desirable for radiator heating, where as indicated in Fig. 2, the tubing should be practically the full length of the radiator, so as to gain contact with practically the full length of radiating fins. Various methods of mounting may be employed. In the examples given, the end caps are provided with screw studs 23 extending therefrom and on these studs are adjustably engaged the internally threaded positioning and supporting sleeves 24, secured by lock nuts 25.

In an arrangement such as illustrated in Fig. 2, where the heating unit is rested directly on the fins, the screw sleeves 24 may simply be backed off the screw stems 23 far enough to frictionally engage the inside faces of the stack casing. Usually however, it is desirable to provide open sockets or brackets 26 to receive the screw sleeves, which latter then serve as adjustable extension supports for definitely positioning the unit within the stack either in contact or out of contact with the fins.

The heating coils should at all times be fully submerged in the coil and consequently these coils are shown in the illustration as mounted eccentrically within the heating tube and the tube is shown as secured with the coils lowermost, so as to be fully submerged and in the deepest portion of the oil, Fig. 1.

To obtain the maximum heat energy and keep down current consumption, a minimum quantity of oil sufficient to cover the heating element at 70° F. is used, the diameter of the tube being thereby determined to an extent by this requirement.

For reasons of efficiency, also a "dry" oil is used, that is one which has been specially treated to remove moisture therefrom. "Transformer oil" has been found satisfactory for the purpose and the unit is made up as follows:

The heating element is entirely sealed within the tube as by a construction such as shown in Fig. 6, where the terminals for the coil or coils are provided by screws 27 fully insulated from the end of the tube as indicated at 28 and locked up in tightly sealed relation by the nuts and sealing washers at 29. The tube is filled with as much of the dry transformer oil as it will hold through a filling opening 30 in the top of the tube and the current is turned on through the coil to bring the temperature well above the boiling point of water and such heat is continued until all the vapor and occluded moisture has been driven out of the oil and out of the interior of the tube and any excess oil has been expelled from the tube. With the moisture driven off and the tube filled or as nearly as practicable filled with oil, the tube is sealed as by tightly setting a sealing plug 31 in the filling opening, which plug furthermore may be sealed as by soldering, brazing or welding. Shrinkage of the oil on cooling will create a slight vacuum in the tube, but this is not objectionable and of course, is preferable to the presence of air or moisture in the tube.

By limiting the amount of oil to substantially sufficient to cover the heating element, using a dry oil, driving off any residual moisture in the oil or tube and sealing the tube while as nearly as possible completely full, a highly efficient electrical heating unit is produced, which being completely sealed retains its efficiency for the normal life of the unit. Upon unsealing and removing the plug, the oil may be inspected or any shrinkage compensated for, but before sealing again, the same care should be observed as to driving off moisture and sealing in a completely filled state.

To increase the radiating area, the tube unit may carry radiating fins as indicated at 32 in Figs. 3, 4 and 5. This construction is particularly suited for use as a radiator unit as illustrated in Figs. 4 and 5, where the finned electrical unit is shown as mounted in a stack casing in place of and as a substitute for the usual finned steam or hot water pipe, making in this instance, an entirely electrical convection, stack radiator.

In Fig. 3, one of the finned or flanged electrical heating units is indicated as mounted in a boiler 33 for heating water and it will be apparent that this form of electrical heating unit may be applied to other purposes.

Instead of controlling the heating unit by a thermostat within the unit and directly subject to oil temperature, as at 18 in Fig. 5, the thermostat, if such is used, may be located outside the unit and be less directly under the influence of the oil temperature. Thus as indicated at 34, in Fig. 4, a thermostatic controlling switch for the unit may be mounted on the stack casing, so as to receive heat from the oil by radiation and metallic conduction to the stack, the action of such thermostat being tempered to some extent by the surrounding air temperature and operating therefore under the joint influence of the oil temperature of the unit and the temperature of the medium, in this instance, the air which the unit is used to heat. In Fig. 3, the action of the thermostat is governed jointly by the oil temperature and the water temperature.

If desired therefore, the thermostatic control may be effected entirely from the oil temperature, or be jointly governed by oil temperature and temperature of the surrounding media, or, in another instance, the thermostatic control may be entirely omitted and the operation of the unit be arbitrarily controlled by a suitable regulating switch. In the stack radiator where the electrical heater is added as an auxiliary as in Figs. 1 and 2, the electrical unit, where space permits, may be placed below instead of above the flanged heating pipe. Also the unit in this case, instead of being a smooth tube in contact with the fins of the radiator, may be itself finned as indicated in Figs. 3, 4 and 5. The adjustable screw mountings in addition to serving as simple and practical means for mechanically fixing the unit in the stack of the radiator also serve for thermally coupling the heating unit in heat conducting relation to the radiator structure. By making the casing of the unit of flush construction, that is with the end caps or at least one end cap of no greater diameter than the body of the pipe, the radiating plates or fins may be forced over the tube or removed therefrom at any time after assembly and the unit may be passed through openings in a radiator casing or the like of a size just large enough to pass the tubing.

As the invention is of broad scope, it will be understood that the terms employed herein have been used in a descriptive rather than in a limiting sense, except possibly for limitations as may be imposed by the state of the prior art.

What is claimed is:

1. An electrical heating unit comprising a hermetically sealed tube, a body of heat conducting liquid substantially filling said tube, an electrical heating element in said tube and electrical terminal means for said heating element sealed through the wall of the tube, said heating element being disposed eccentrically within the tube and adjustable means for securing and supporting said tube substantially horizontally with said eccentrically related heating element in the lower portion of the tube and consequently in the deepest part of the liquid substantially filling the tube.

2. In combination, a convection type stack radiator comprising a radiator casing open at the bottom for relatively cool air and open at the top to discharge heated air, a heating pipe extending across the lower portion of the casing, closely spaced heat radiating fins on said pipe, a tubular member supported in the casing substantially parallel to the heating pipe close to the heat radiating fins and in the air stream traversing the fins, a body of dry oil substantially filling said tubular member, an electric heating unit submerged in said oil and having terminal connections sealed through said tubular member and external electric control connections associated with said sealed terminals, said tubular member of the electric heating unit resting on and being in heat conducting relation to the fins on the heating pipe and to the radiator casing.

3. A radiator of the convection, stack type, comprising a radiator casing open at the bottom for admission of cool air and open at the top for discharge of heated air, a pipe extending across the lower portion of the casing, closely spaced heat radiating fins on said pipe, a body of dry oil substantially filling said pipe, an electrical heating unit sealed in said pipe and wholly submerged in said body of oil and external circuit connections including control means for said electric heating element, said pipe extending substantially horizontally, the radiating fins thereon being arranged substantially vertically and the heating element being disposed eccentrically within the pipe, said pipe being supported with said heating element at the lower side of the pipe and in the deepest portion of the body of oil.

4. In combination, a convection type stack radiator comprising a radiator casing open at the bottom for relatively cool air and open at the top to discharge heated air, a heating pipe extending across the lower portion of the casing, closely spaced heat radiating fins on said pipe, a tubular member supported in the casing substantially parallel to the heating pipe close to the heat radiating fins and in the air stream traversing the fins, a body of dry oil substantially filling said tubular member, an electric heating unit submerged in said oil and having terminal connections sealed through said tubular member and external electric control connections associated with said sealed terminals, said heating element being located eccentrically within the tubular member and the tubular member being supported with said eccentrically disposed heating element in the lower portion of the same and thus within the deepest part of the body of oil.

5. An electric heating unit comprising a length of pipe, caps sealed over the ends of said pipe and at least one of said caps being of no greater external diameter than the pipe, an insulating support within the sealed pipe, a heating element carried by said support and disposed eccentrically of the axis of the pipe, a body of dry oil substantially filling the sealed pipe, means for definitely locating the sealed pipe in substantially horizontal position with said eccentrically disposed heating element in the lower portion of the pipe and submerged in the deepest part in the body of the oil and circuit terminal means for the heating element sealed through one of the walls forming the oil containing chamber within the pipe.

JAMES G. DOUGHERTY.